United States Patent
Kadmon et al.

(10) Patent No.: US 10,341,867 B1
(45) Date of Patent: Jul. 2, 2019

(54) SYSTEM, METHOD, AND COMPUTER PROGRAM FOR IMPROVING CARRIER WI-FI AUTHENTICATION RESPONSE TIME

(71) Applicant: Amdocs Development Limited, Limassol (CY)

(72) Inventors: Yaron Kadmon, Kfar Saba (IL); Dori Ben-Moshe, Ramat HaSharon (IL); Ronen Kenig, Hod Hasharon (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 88 days.

(21) Appl. No.: 15/333,040

(22) Filed: Oct. 24, 2016

Related U.S. Application Data

(60) Provisional application No. 62/245,913, filed on Oct. 23, 2015.

(51) Int. Cl.
*H04W 12/08* (2009.01)
*H04W 8/00* (2009.01)
(Continued)

(52) U.S. Cl.
CPC ......... *H04W 12/08* (2013.01); *H04L 63/0281* (2013.01); *H04L 63/08* (2013.01);
(Continued)

(58) Field of Classification Search
CPC ...................................................... H04W 12/08
(Continued)

(56) References Cited

U.S. PATENT DOCUMENTS 8,391,264 B1  3/2013  Breau et al.
9,351,270 B2 *  5/2016  Brock .................. H04W 60/04
(Continued)

FOREIGN PATENT DOCUMENTS

GB  2495550 A  4/2013
WO  2006088585 A2  8/2006
WO  2014175091 A1  10/2014

OTHER PUBLICATIONS

U.S. Appl. No. 14/558,635, filed Dec. 2, 2014.
Choi, H.-H. et al., "A Seamless Handoff Scheme for UMTS-WLAN Interworking," Globecom 2004, IEEE, 2004, pp. 1559-1564.

*Primary Examiner* — Dant B Shaifer Harriman
(74) *Attorney, Agent, or Firm* — Zilka-Kotab, P.C.

(57) ABSTRACT

A system, method, and computer program product are provided for improving carrier Wi-Fi authentication response time. In use, at least one message is received at a network policy server indicating user equipment is present in at least one cell associated with a cellular network, the at least one message including information associated with the user equipment and at least one cell identifier associated with the at least one cell. Additionally, one or more Wi-Fi hot-spots that reside in a coverage area associated with the at least one cell are identified. Further, at least one indication that the user equipment is either authorized or not authorized to connect to at least one of the one or more Wi-Fi hot-spots is sent, the at least one indication including connection credentials associated with the user equipment if the user equipment is authorized to connect to at least one of the one or more Wi-Fi hot-spots, and the at least one indication being sent prior to the user equipment requesting to access any of the one or more Wi-Fi hot-spots.

14 Claims, 7 Drawing Sheets

(51) Int. Cl.
*H04L 29/06* (2006.01)
*H04W 12/06* (2009.01)
*H04W 28/08* (2009.01)
*H04W 84/04* (2009.01)
*H04W 84/12* (2009.01)

(52) U.S. Cl.
CPC ............ *H04L 63/10* (2013.01); *H04W 8/005* (2013.01); *H04W 12/06* (2013.01); *H04W 28/08* (2013.01); *H04W 84/042* (2013.01); *H04W 84/12* (2013.01)

(58) Field of Classification Search
USPC .......................................................... 726/4
See application file for complete search history.

(56) References Cited

U.S. PATENT DOCUMENTS

| | | | |
|---|---|---|---|
| 2005/0125529 A1* | 6/2005 | Brockway | H04L 67/16 709/224 |
| 2006/0149814 A1* | 7/2006 | Borella | H04L 67/24 709/204 |
| 2007/0149211 A1* | 6/2007 | Dunn | H04W 4/02 455/456.1 |
| 2009/0199281 A1* | 8/2009 | Cai | H04L 63/083 726/7 |
| 2012/0044914 A1* | 2/2012 | Chen | H04W 12/08 370/338 |
| 2014/0051391 A1* | 2/2014 | Torres | H04W 12/06 455/411 |
| 2016/0095037 A1 | 3/2016 | Morita | |
| 2016/0262020 A1* | 9/2016 | Zalzalah | H04L 63/101 |

* cited by examiner

SYSTEM, METHOD, AND COMPUTER PROGRAM FOR IMPROVING CARRIER WI-FI AUTHENTICATION RESPONSE TIME

CLAIM OF PRIORITY

This application claims the benefit of U.S. Provisional Application No. 62/245,913, filed Oct. 23, 2015, the entire contents of which are incorporated herein by reference.

FIELD OF THE INVENTION

The present invention relates to networks, and more particularly to carrier Wi-Fi network authentication.

BACKGROUND

Wi-Fi networking has become one of the most popular technologies that enable wireless connectivity. Wi-Fi networking is popular with cellular service providers mainly, but not solely, for cellular network offload by fixed access providers that are broadening their offering and by private players such as shops, venues, and others that would like to improve their customer experience and offer additional services.

To ensure network privacy, security, or as another revenue stream, many providers offer "managed" or "carrier grade" Wi-Fi services that condition Wi-Fi access with a user/device authentication process. However, one of the major hurdles in this offering is the time it takes to process the authentication and authorization request.

There is thus a need for addressing these and/or other issues associated with the prior art.

SUMMARY

A system, method, and computer program product are provided for improving carrier Wi-Fi authentication response time. In use, at least one message is received at a network policy server indicating user equipment is present in at least one cell associated with a cellular network, the at least one message including information associated with the user equipment and at least one cell identifier associated with the at least one cell. Additionally, one or more Wi-Fi hot-spots that reside in a coverage area associated with the at least one cell are identified. Further, at least one indication that the user equipment is either authorized or not authorized to connect to at least one of the one or more Wi-Fi hot-spots is sent, the at least one indication including connection credentials associated with the user equipment if the user equipment is authorized to connect to at least one of the one or more Wi-Fi hot-spots, and the at least one indication being sent prior to the user equipment requesting to access any of the one or more Wi-Fi hot-spots.

DETAILED DESCRIPTION

Figure 1:
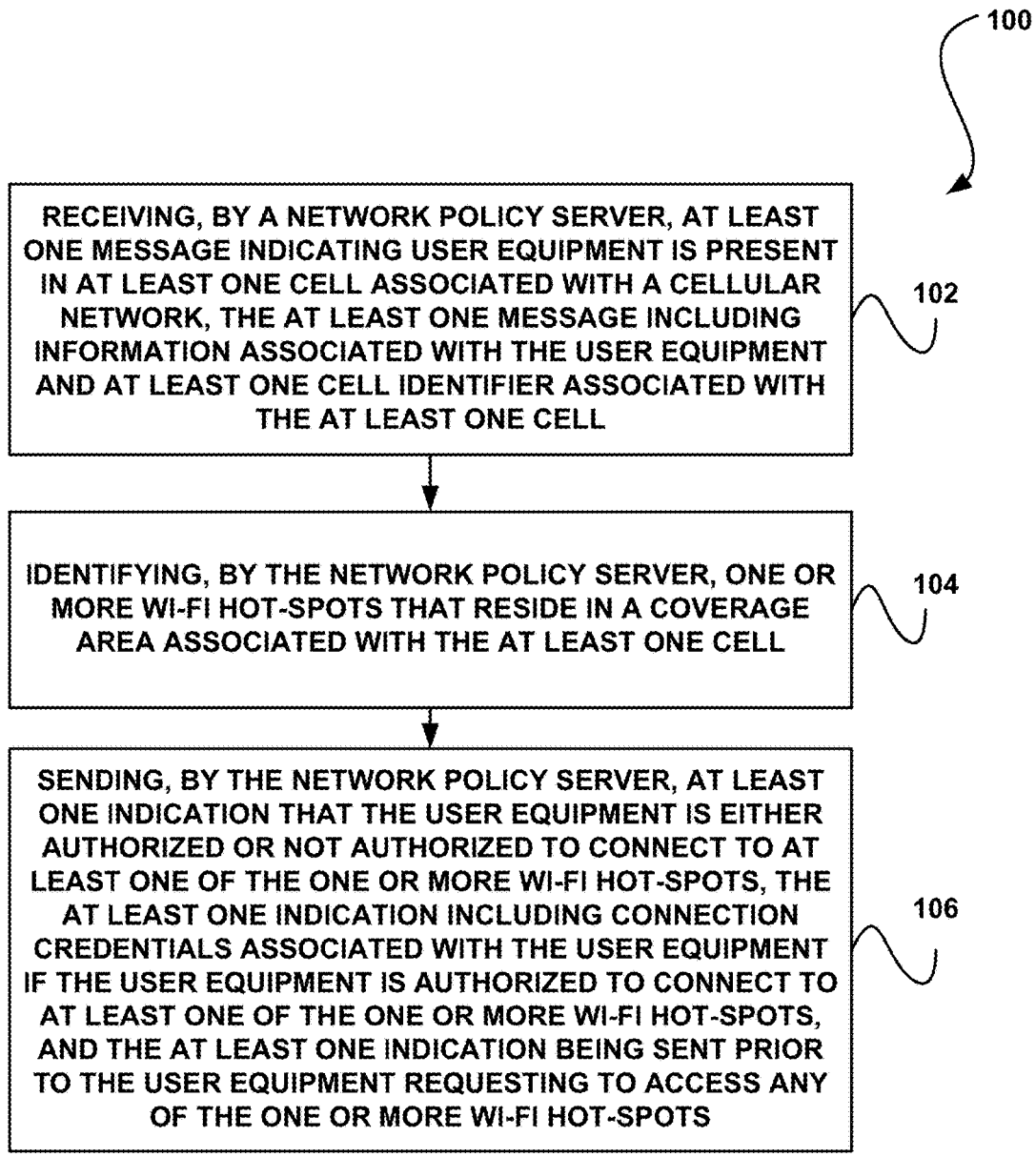
FIG. 1 illustrates a method for improving carrier Wi-Fi authentication response time, in accordance with one embodiment.

FIG. 1 illustrates a method 100 for improving carrier Wi-Fi authentication response time, in accordance with one embodiment.

As shown, at least one message is received by a network policy server indicating user equipment is present in at least one cell associated with a cellular network. See operation 102. The message includes information associated with the user equipment and at least one cell identifier associated with the at least one cell. The user equipment may include any mobile device, such as a cellular phone, a tablet computer, a laptop computer, etc.

Additionally, the network policy server identifies one or more Wi-Fi hot-spots that reside in a coverage area associated with the at least one cell. See operation 104. In one embodiment, identifying the one or more Wi-Fi hot-spots that reside in the coverage area associated with the cell may include identifying all Wi-Fi hot-spots that reside in the coverage area associated with the at least one cell. In one embodiment, the network policy server may be provided information indicating which Wi-Fi hot-spots reside in a coverage area (e.g. from the Wi-Fi hot-spots, from proxies associated with the Wi-Fi hot-spots, etc.).

Further, the network policy server sends at least one indication that the user equipment is either authorized or not authorized to connect to at least one of the one or more Wi-Fi hot-spots. See operation 106. The indication includes connection credentials associated with the user equipment if the user equipment is authorized to connect to at least one of the Wi-Fi hot-spots. Also, the indication is sent prior to the user equipment requesting to access any of the Wi-Fi hot-spots.

In one embodiment, the indication that the user equipment is either authorized or not authorized to connect to the Wi-Fi hot-spots may be sent to each of the Wi-Fi hot-spots. In another embodiment, the indication may be sent to at least one proxy server associated with the Wi-Fi hot-spots.

For example, when a user with a device enters a specific cell, the cellular network will notify the network policy server of this event. The message will include at least the information about the user device (e.g. a MAC ID, etc.) and the serving cell ID, which translates into a geo-fencing area. The server will update (e.g. push) all Wi-Fi hot-spots that reside at the coverage area of this cell with the credentials and/or an allowance to connect or not to this user device. This can be done by sending push notifications to all hot-spots or by updating a proxy server that represents all the hot-spots and can interact with them directly (either push or pull).

When the user device sends the connectivity request, one of two actions may occur depending on the implementation. The first option is a push without a proxy server. In this case, once the user device connectivity request arrives, the hot-spot may already be preloaded with the authentication results and may immediately answer (connect or not) the user device. This technique saves both messaging round trip and authentication processing.

The second option is a pull with a proxy server. In this case, once the user device connectivity request arrives, the hot-spot may forward it to the designated proxy server, which may already be preloaded with the authentication results and may immediately answer (connect or not) the user device. This technique saves the authentication processing.

It should be noted that the method 100 may be implemented utilizing various systems, hardware (e.g. processors, etc.), software, applications, user interfaces, etc., as dictated by the implementer. Moreover, the network policy server may be associated with various systems and may include one or more processors, memory, logic, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

As mobile traffic continues to grow, mobile operators require better solutions for reducing the cost per bit and for increasing the revenue per subscriber. A key hurdle to this is service disruption caused by congested cells, which could be a major factor for increasing subscriber frustration up to an increase the churn rate.

Operators around the world have different tools that they use to tackle the bandwidth demand surge, ranging from different options for CAPEX investments (e.g. buy more frequencies, invest in cell towers, move to HetNet solutions, increase backhaul capacity, etc.), while taking actions to increase their ROI by using different optimization technologies. These might include traffic shaping, video optimizers, application based steering and more.

In addition to this, new emerging technologies such as software defined networking (SDN) and network function virtualization (NFV) hold the promise of a new virtualized world where commercial off the shelf (COTS) hardware can be used with open source software projects for unlocking vendor silos, with this being followed by a dramatic decrease in investment and an incremental increase in flexibility and rollout of services.

Wi-Fi technology provides a wireless, simple, straightforward and affordable way to carry data to and from handheld devices. Wi-Fi technology had gained enormous popularity in the residential space, however, lately more and more carriers (service providers) have deployed Wi-Fi hotspots in public and even in outdoor locations. In many cases, carrier deployed Wi-Fi is referred to as "managed" Wi-Fi or "Carrier" Wi-Fi, as the initial connectivity process between the user handheld device and the carrier hotspot require some kind of authentication before the user is allowed to use the network. This procedure is managed by the carrier infrastructure through different policy servers such as AAA servers (Authentication, Authorization and Accounting servers), HetNet connectivity servers, conflict managers, and others.

As Wi-Fi technology gains popularity and becomes extremely common, many public places offer free or charged Wi-Fi access. In fact, when one scans for available Wi-Fi networks while walking through a mall, train-station, or similar venue, typical results reveal at least a couple of available networks, and usually more.

There are different types of Wi-Fi access providers. For example, there are cellular network service providers that offer Wi-Fi access on top and in parallel to their cellular network offering, usually to increase bandwidth, offload congestion, and provide a means of wireless communication when cellular networks are unavailable. As another example, there are MSO/fixed network providers that provide Wi-Fi connectivity that is backhauled using their fixed line infrastructure. Sometimes these carriers partner with cellular providers to offer cellular connectivity when Wi-Fi coverage is not available.

As another example, there is Wi-Fi service offered by on-site shops and stores. This service is local to the shop location and usually does not provide high quality connectivity. However, unlike the others, this service is usually offered for free and does not require authentication/opt-in.

When both cellular and Wi-Fi networks are available, the device can (depending on credentials and policies) connect to any of the networks and start sending/receiving traffic using such networks. The decision of which network to use is subject to different configuration/actions. For example, there is user control where the user can make the decision to which network to connect, manually enter credentials, decide on payment method, etc. As another example, there is device control, which is an on device application/agent that can take control and decide which network to use. As another example, there is network control where network providers can dictate to the device which network to use, depending on different parameters such as congestion status, time of day, network availability, etc. Also, there is manual/automatic control where a device can be configured to connect automatically to Wi-Fi networks or let the user take the action.

Usually, when the cellular operator has both cellular and Wi-Fi coverage, and the decision is made to offload the device to the Wi-Fi network, the service provider would prefer to keep the user on its own Wi-Fi network, and not let the user be offloaded to a third party network (e.g. a coffee shop, etc.). Reasons for this usually are to keep subscriber visibility and increase stickiness. This is also true for non-cellular CSPs, fixed, and Wi-Fi only providers.

Figure 2:
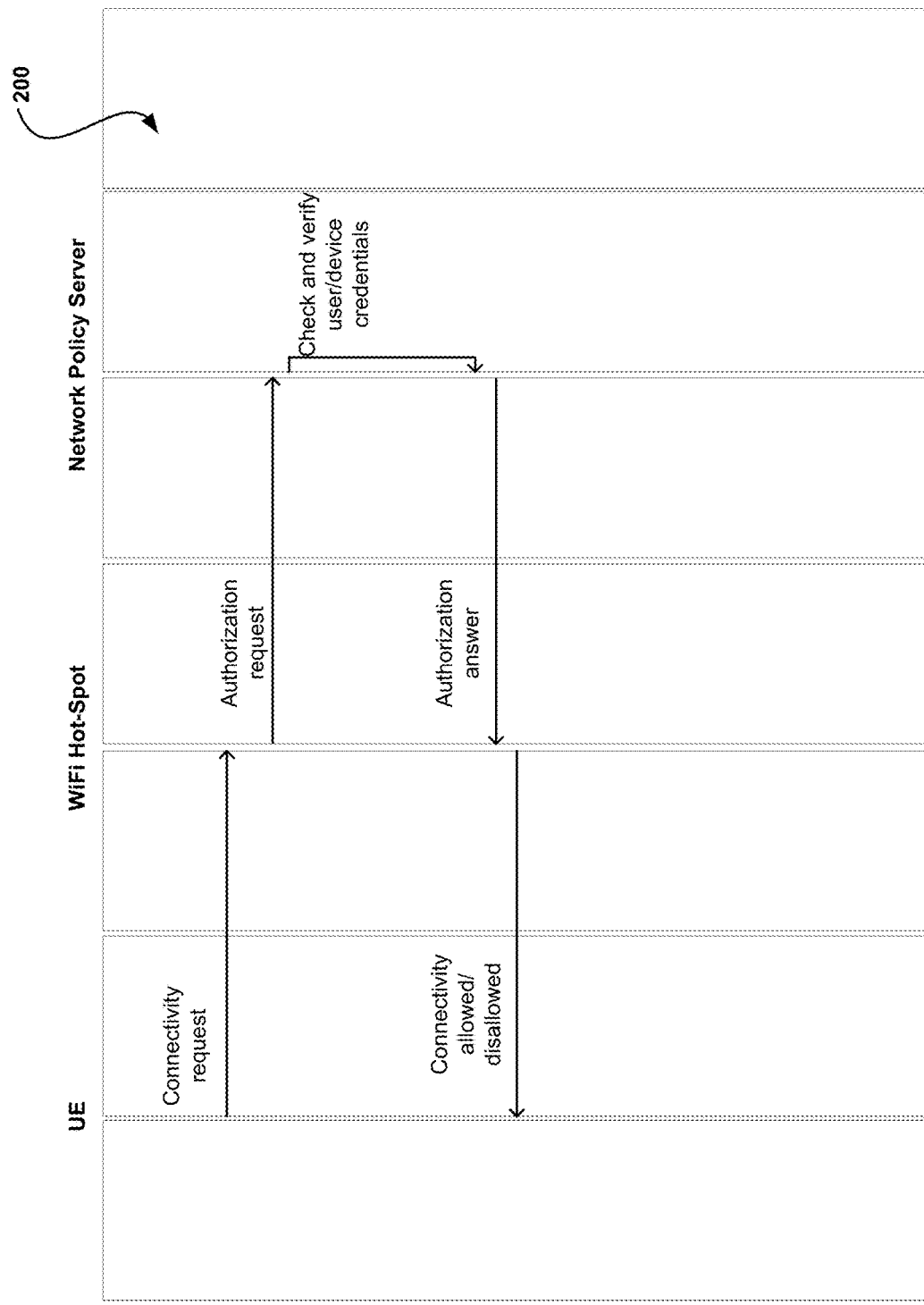
FIG. 2 illustrates a flow of a typical authentication process for user equipment.

However, when connecting to a carrier grade Wi-Fi network, the device undergoes a process of device/user authentication. In this process, the offload request is tested versus the device/user credentials by a carrier operated server, usually residing within the carrier core network. This authentication process may take up to tens of seconds and damages the user experience. The reason for the long lead time is that during this authentication process, the server validates the request by looking up the device/user credentials in its entire database, matching the records, applying polices and sending its decision back to the Wi-Fi hotspot. FIG. 2 illustrates a flow 200 of a typical authentication process for user equipment.

To improve and increase user experience, this authentication process may be modified. By obtaining the device location from the cellular network, the carrier systems can point out in advance the Wi-Fi hotspots to which the user may be offloaded. Knowing this, the system can proactively run the authentication procedure and push the results to the relevant hotspots. Once they get the device connection request or probe broadcast message, the access point can immediately connect the device as they already have the authentication results and the HetNet server decision. This can save the entire roundtrip and on-demand calculation of the authentication process, allowing a much faster response and better user experience.

This technique does not require modifications to the authentication process itself. In other words, the technique does not require reusing the cellular network authentication results with the Wi-Fi network. The goal is to use the location information from the cellular network to expedite the Wi-Fi network authentication process, but not to alter the principles that are used to authenticate users on any network.

More information regarding device connection requests or probe broadcast message exchange may be found in U.S. patent application Ser. No. 14/558,635, filed Dec. 2, 2014, titled "SYSTEM, METHOD, AND COMPUTER PROGRAM FOR ALLOWING MOBILE DEVICES TO ACCESS WI-FI ACCESS POINTS", which is incorporated herein by reference.

Figure 3:
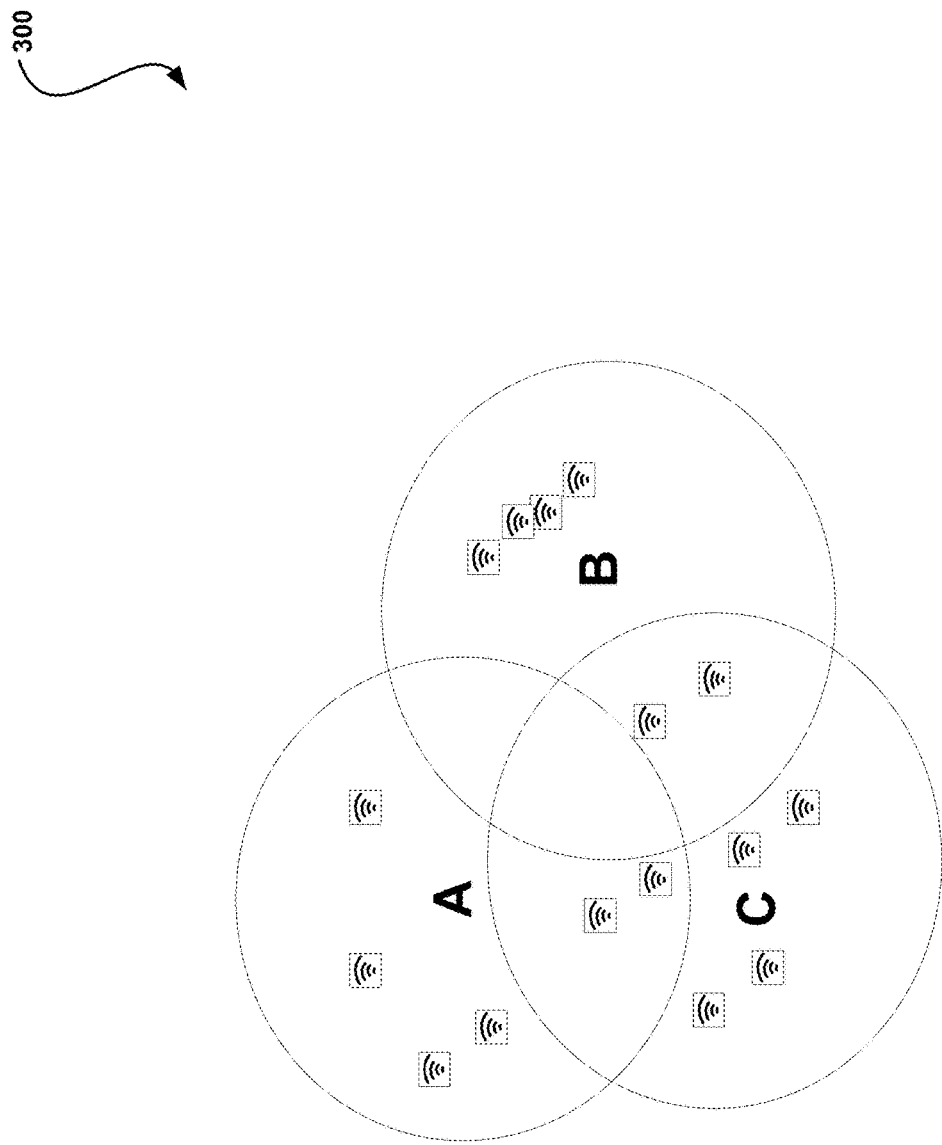
FIG. 3 illustrates an example of a typical deployment of a network operator that uses both cellular and Wi-Fi technologies, in accordance with one embodiment.

FIG. 3 illustrates an example 300 of a typical deployment of a network operator that uses both cellular and Wi-Fi technologies, in accordance with one embodiment. As an option, the example 300 may be viewed in the context of the details of the previous figures. Of course, however, the example 300 may be viewed in the context of any desired environment. Further, the aforementioned definitions may equally apply to the description below.

With respect to FIG. 3, the large circles, A, B and C, represent cellular macro base-stations, while the Wi-Fi symbols represent Wi-Fi hot-spot deployments. Macro base-stations cover relatively large areas (with a radius of a couple of kilometers), while Wi-Fi hot-spots cover small footprints.

By implementing the techniques described herein, when user equipment (UE) enters a specific cell (in this example, A, B, or C), the cellular network will notify the network policy server of this event. The message will include at least the information about the UE (e.g. UE MAC ID, etc.) and the serving cell ID, which translate into a geo-fencing area. The server will update (e.g. push) all Wi-Fi hot-spots that reside in the coverage area of this cell with the credentials/allowance to connect or not to this UE. This can be done by sending push notifications to all hot-spots or by updating a proxy server that represents all of the hot-spots and can interact with them directly (either push or pull).

When the UE sends the connectivity request, one of two actions may occur, depending on implementation. The first option is a push without proxy server. In this case, once the UE connectivity request arrives, the hot-spot is already preloaded with the authentication results and immediately answers (connect or not) the UE. This technique saves both messaging round trip and authentication processing.

Figure 4:
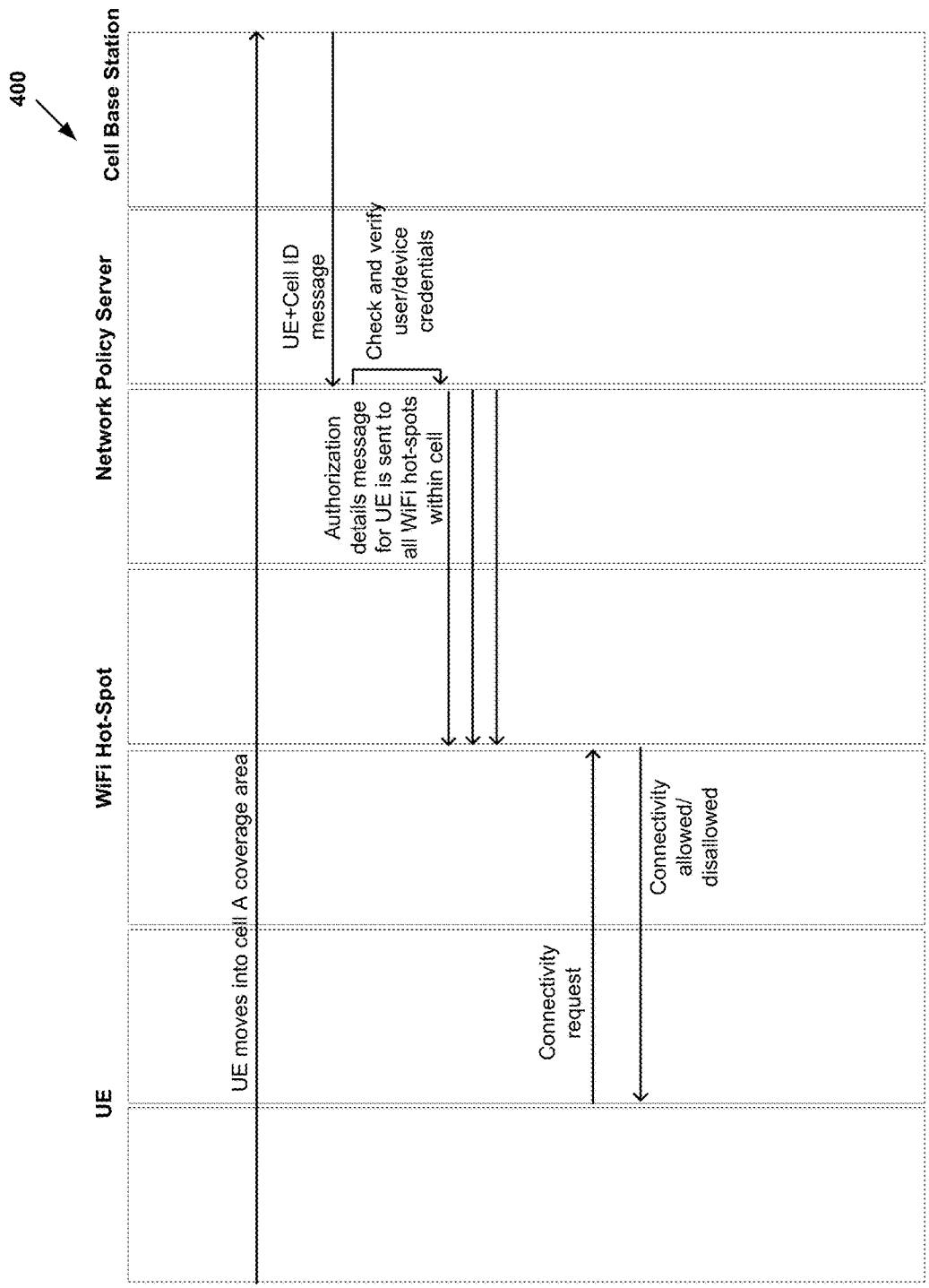
FIG. 4 illustrates a system flow showing a cell initiated authorization credential push mechanism, in accordance with one embodiment.

FIG. 4 illustrates a system flow 400 showing a cell initiated authorization credential push mechanism, in accordance with one embodiment. As an option, the system flow 400 may be viewed in the context of the details of the previous figures. Of course, however, the system flow 400 may be viewed in the context of any desired environment. Further, the aforementioned definitions may equally apply to the description below.

This method shown in FIG. 4 may require some hardware or software changes to the hot-spot.

The second option is a pull with a proxy server. In this case, once the UE connectivity request arrives, the hot-spot forwards it to the designated proxy server, which is already preloaded with the authentication results and immediately answers (connect or not) the UE. This technique saves the authentication processing.

Figure 5:
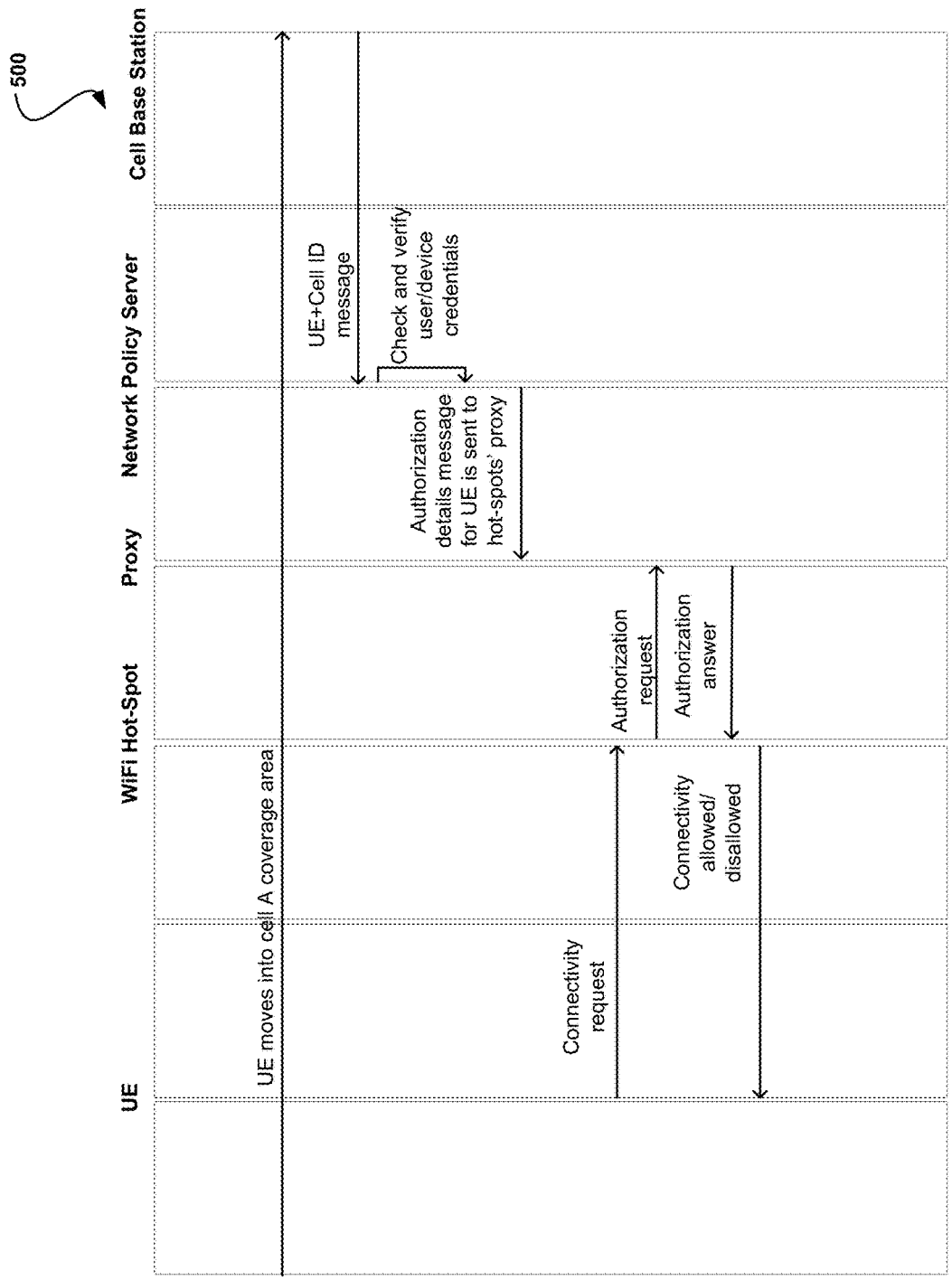
FIG. 5 illustrates a system flow showing a cell initiated authorization credential with a proxy server, in accordance with one embodiment.

FIG. 5 illustrates a system flow 500 showing a cell initiated authorization credential with a proxy server, in accordance with one embodiment. As an option, the system flow 500 may be viewed in the context of the details of the previous figures. Of course, however, the system flow 500 may be viewed in the context of any desired environment. Further, the aforementioned definitions may equally apply to the description below.

This method shown in FIG. 5 does not require any hardware or software changes to the hot-spot.

Thus, for operators that offer both cellular and Wi-Fi connectivity, the methods and systems described herein use location information available from the cellular network and bundle it with proactive push technology that significantly reduces the time needed to complete the authorization request resulting a much faster offload process and a better user experience.

These techniques differ from preloading a phone (e.g. via the SIM card, or other device) with credentials that can uniquely identify the user that is supported by a backend system that exchanges credential information and policies between different providers. Moreover, there is no need to modify the user equipment.

Further, in one embodiment, by using real time call trace information, the area where the user is located can be narrowed from a cell level to a smaller geo-fenced area, allowing the message to be sent to a smaller subset of hotspots.

Figure 6:
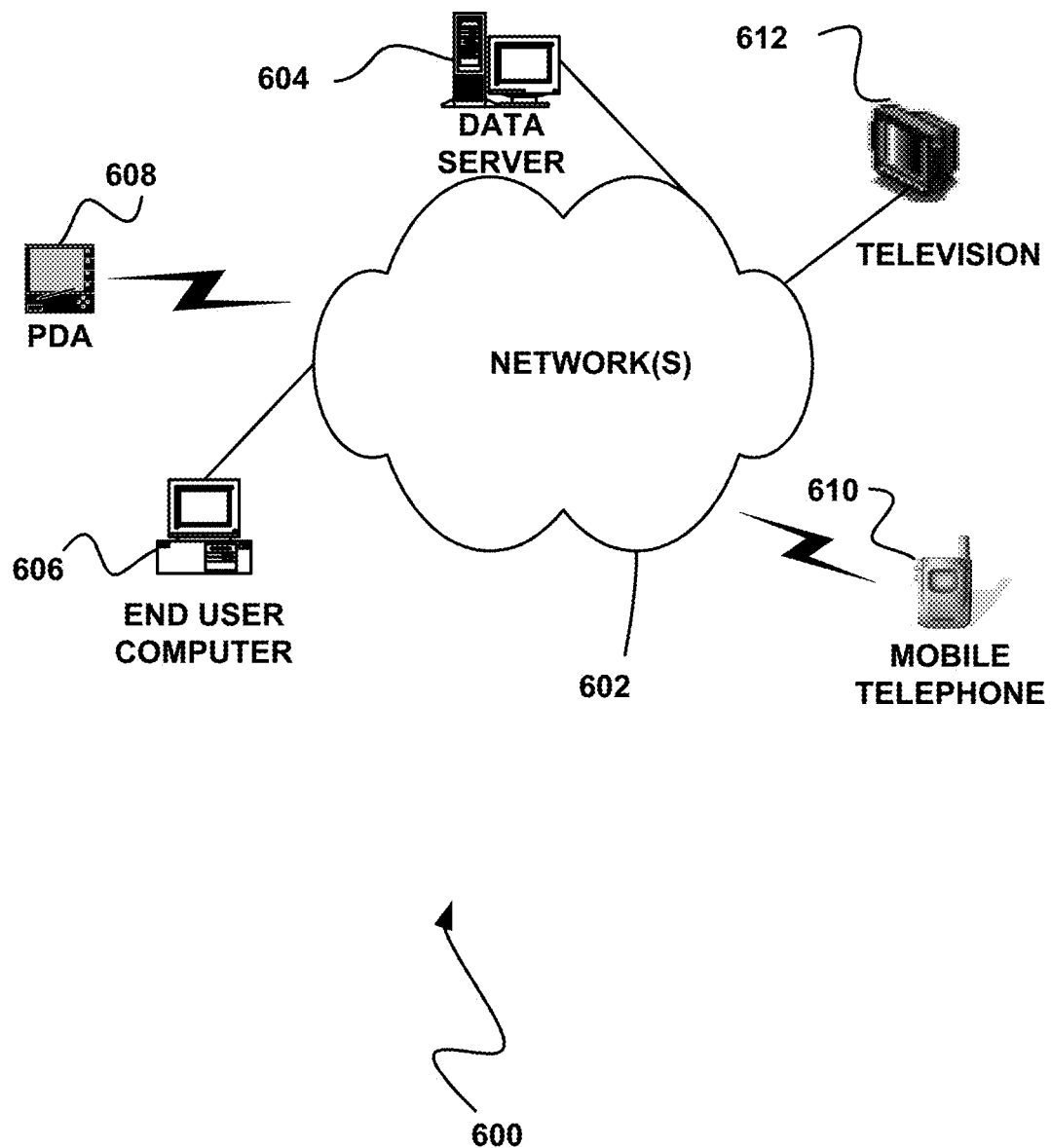
FIG. 6 illustrates a network architecture, in accordance with one possible embodiment.

FIG. 6 illustrates a network architecture 600, in accordance with one possible embodiment. As shown, at least one network 602 is provided. In the context of the present network architecture 600, the network 602 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 602 may be provided.

Coupled to the network 602 is a plurality of devices. For example, a server computer 604 and an end user computer 606 may be coupled to the network 602 for communication purposes. Such end user computer 606 may include a desktop computer, lap-top computer, and/or any other type of logic. Still yet, various other devices may be coupled to the network 602 including a personal digital assistant (PDA) device 608, a mobile phone device 610, a television 612, etc.

Figure 7:
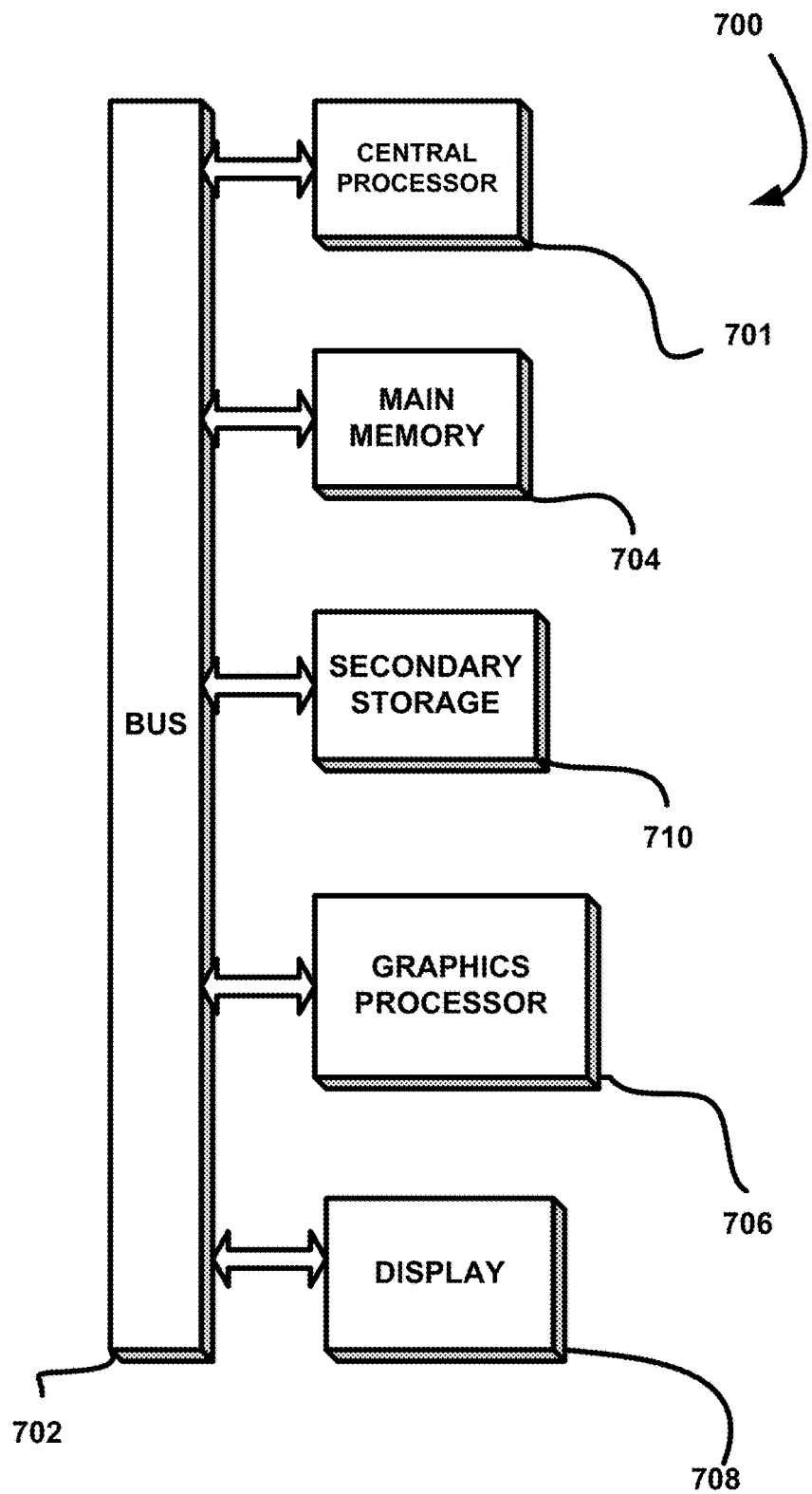
FIG. 7 illustrates an exemplary system, in accordance with one embodiment.

FIG. 7 illustrates an exemplary system 700, in accordance with one embodiment. As an option, the system 700 may be implemented in the context of any of the devices of the network architecture 600 of FIG. 6. Of course, the system 700 may be implemented in any desired environment.

As shown, a system 700 is provided including at least one central processor 701 which is connected to a communication bus 702. The system 700 also includes main memory 704 [e.g. random access memory (RAM), etc.]. The system 700 also includes a graphics processor 706 and a display 708.

The system 700 may also include a secondary storage 710. The secondary storage 710 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 704, the secondary storage 710, and/or any other memory, for that matter. Such computer programs, when executed, enable the system 700 to perform various functions (as set forth above, for example). Memory 704, storage 710 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A computer program product embodied on a non-transitory computer readable medium, comprising computer code for:

receiving, by a network policy server, at least one message indicating user equipment is present in at least one cell associated with a cellular network, the at least one message including information associated with the user equipment and at least one cell identifier associated with the at least one cell;

responsive to receiving the at least one message, identifying, by the network policy server, one or more Wi-Fi hot-spots that reside in a coverage area associated with the at least one cell;

responsive to identifying the one or more Wi-Fi hot-spots that reside in the coverage area associated with the at least one cell in which the user equipment is present, determining, by the network policy server, a first set of Wi-Fi hot-spots in the one or more Wi-Fi hot-spots that the user equipment is authorized to connect to;

sending, by the network policy server to each Wi-Fi hot-spot in the first set of Wi-Fi hot-spots and prior to the user equipment requesting to access any of the one or more Wi-Fi hot-spots, an indication that the user equipment is authorized to connect to the Wi-Fi hot-spot including credentials associated with the user equipment, for use by the Wi-Fi hot-spot in granting a connection with the user equipment;

responsive to identifying the one or more Wi-Fi hot-spots that reside in the coverage area associated with the at least one cell in which the user equipment is present, determining, by the network policy server, a second set of Wi-Fi hot-spots in the one or more Wi-Fi hot-spots that the user equipment is not authorized to connect to; and sending, by the network policy server to each Wi-Fi hot-spot in the second set of Wi-Fi hot-spots and prior to the user equipment requesting to access any of the one or more Wi-Fi hot-spots, an indication that the user equipment is not authorized to connect to the Wi-Fi hot-spot.

2. The computer program product of claim 1, further comprising computer code for receiving, at a particular Wi-Fi hot-spot in the first set of Wi-Fi hot-spots after the particular Wi-Fi hot-spot receives from the network policy server the indication that the user equipment is authorized to connect to the particular Wi-Fi hot-spot, a connection request from the user equipment.

3. The computer program product of claim 2, further comprising computer code for determining, at the particular Wi-Fi hot-spot, that the user equipment is authorized to connect to the Wi-Fi hot-spot utilizing the credentials associated with the user equipment previously received by the particular Wi-Fi hot-spot.

4. The computer program product of claim 1, wherein identifying the one or more Wi-Fi hot-spots that reside in the coverage area associated with the at least one cell includes identifying all Wi-Fi hot-spots that reside in the coverage area associated with the at least one cell.

5. A method, comprising:

receiving, by a network policy server, at least one message indicating user equipment is present in at least one cell associated with a cellular network, the at least one message including information associated with the user equipment and at least one cell identifier associated with the at least one cell;

responsive to receiving the at least one message, identifying, by the network policy server, one or more Wi-Fi hot-spots that reside in a coverage area associated with the at least one cell;

responsive to identifying the one or more Wi-Fi hot-spots that reside in the coverage area associated with the at least one cell in which the user equipment is present, determining, by the network policy server, a first set of Wi-Fi hot-spots in the one or more Wi-Fi hot-spots that the user equipment is authorized to connect to;

sending, by the network policy server to each Wi-Fi hot-spot in the first set of Wi-Fi hot-spots and prior to the user equipment requesting to access any of the one or more Wi-Fi hot-spots, an indication that the user equipment is authorized to connect to the Wi-Fi hot-spot including credentials associated with the user equipment, for use by the Wi-Fi hot-spot in granting a connection with the user equipment;

responsive to identifying the one or more Wi-Fi hot-spots that reside in the coverage area associated with the at least one cell in which the user equipment is present, determining, by the network policy server, a second set of Wi-Fi hot-spots in the one or more Wi-Fi hot-spots that the user equipment is not authorized to connect to; and sending, by the network policy server to each Wi-Fi hot-spot in the second set of Wi-Fi hot-spots and prior to the user equipment requesting to access any of the one or more Wi-Fi hot-spots, an indication that the user equipment is not authorized to connect to the Wi-Fi hot-spot.

6. The method of claim 5, further comprising receiving, at a particular Wi-Fi hot-spot in the first set of Wi-Fi hot-spots after the particular Wi-Fi hot-spot receives from the network policy server the indication that the user equipment is authorized to connect to the particular Wi-Fi hot-spot, a connection request from the user equipment.

7. The method of claim 6, further comprising determining, at the particular Wi-Fi hot-spot, that the user equipment is authorized to connect to the Wi-Fi hot-spot utilizing the credentials associated with the user equipment previously received by the particular Wi-Fi hot-spot.

8. The method of claim 5, wherein identifying the one or more Wi-Fi hot-spots that reside in the coverage area associated with the at least one cell includes identifying all Wi-Fi hot-spots that reside in the coverage area associated with the at least one cell.

9. A system comprising:

a memory system; and one or more processing cores coupled to the memory system and that are each configured for:

receiving, by a network policy server, at least one message indicating user equipment is present in at least one cell associated with a cellular network, the at least one message including information associated with the user equipment and at least one cell identifier associated with the at least one cell;

responsive to receiving the at least one message, identifying, by the network policy server, one or more Wi-Fi hot-spots that reside in a coverage area associated with the at least one cell;

responsive to identifying the one or more Wi-Fi hot-spots that reside in the coverage area associated with the at least one cell in which the user equipment is present, determining, by the network policy server, a first set of Wi-Fi hot-spots in the one or more Wi-Fi hot-spots that the user equipment is authorized to connect to;

sending, by the network policy server to each Wi-Fi hot-spot in the first set of Wi-Fi hot-spots and prior to the user equipment requesting to access any of the one or more Wi-Fi hot-spots, an indication that the user equipment is authorized to connect to the Wi-Fi hot-spot including credentials associated with the user equipment, for use by the Wi-Fi hot-spot in granting a connection with the user equipment;

responsive to identifying the one or more Wi-Fi hot-spots that reside in the coverage area associated with the at least one cell in which the user equipment is present, determining, by the network policy server, a second set of Wi-Fi hot-spots in the one or more Wi-Fi hot-spots that the user equipment is not authorized to connect to; and sending, by the network policy server to each Wi-Fi hot-spot in the second set of Wi-Fi hot-spots and prior to the user equipment requesting to access any of the one or more Wi-Fi hot-spots, an indication that the user equipment is not authorized to connect to the Wi-Fi hot-spot.

10. The system of claim 9, wherein identifying the one or more Wi-Fi hot-spots that reside in the coverage area associated with the at least one cell includes identifying all Wi-Fi hot-spots that reside in the coverage area associated with the at least one cell.

11. The computer program product of claim 1, further comprising computer code for receiving, at a particular Wi-Fi hot-spot in the second set of Wi-Fi hot-spots after the particular Wi-Fi hot-spot receives from the network policy server the indication that the user equipment is not authorized to connect to the particular Wi-Fi hot-spot, a connection request from the user equipment.

12. The computer program product of claim 11, further comprising computer code for determining, at the particular Wi-Fi hot-spot, that the user equipment is not authorized to connect to the Wi-Fi hot-spot utilizing the indication previously received by the particular Wi-Fi hot-spot.

13. The computer program product of claim 1, wherein determining, by the network policy server, the first set of Wi-Fi hot-spots in the one or more Wi-Fi hot-spots that the user equipment is authorized to connect to and determining, by the network policy server, the second set of Wi-Fi hot-spots in the one or more Wi-Fi hot-spots that the user equipment is not authorized to connect to is performed by:

authenticating the user equipment in association with each Wi-Fi hot-spot in the one or more Wi-Fi hot-spots.

14. The computer program product of claim 13, wherein a result of the authenticating is pushed to each Wi-Fi hot-spot in the one or more Wi-Fi hot-spots.

\* \* \* \* \*